United States Patent
Lection et al.

(10) Patent No.: US 10,139,838 B2
(45) Date of Patent: Nov. 27, 2018

(54) METHODS AND SYSTEMS FOR MULTIPLE DRONE DELIVERY SYSTEM

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/277,245

(22) Filed: Sep. 27, 2016

(65) Prior Publication Data
US 2018/0088598 A1    Mar. 29, 2018

(51) Int. Cl.
*G05D 1/10* (2006.01)
*B64C 39/02* (2006.01)
*B64D 27/24* (2006.01)

(52) U.S. Cl.
CPC ........... *G05D 1/104* (2013.01); *B64C 39/024* (2013.01); *B64C 2201/082* (2013.01); *B64C 2201/128* (2013.01); *B64D 27/24* (2013.01)

(58) Field of Classification Search
CPC .................. G05D 1/104; B64C 39/024; B64C 2201/082; B64C 2201/128; B64C 27/24
See application file for complete search history.

(56) References Cited

U.S. PATENT DOCUMENTS

| | | | |
|---|---|---|---|
| 7,789,339 B2 | 9/2010 | Sommer | |
| 9,205,922 B1* | 12/2015 | Bouwer | B64D 9/00 |
| 2007/0102565 A1 | 5/2007 | Speer et al. | |
| 2009/0294573 A1 | 12/2009 | Wilson et al. | |
| 2010/0213309 A1* | 8/2010 | Parks | B64C 3/16 244/46 |
| 2014/0374532 A1* | 12/2014 | Duffy | B64C 37/02 244/2 |
| 2016/0031564 A1 | 2/2016 | Yates | |
| 2016/0107750 A1* | 4/2016 | Yates | B64C 39/024 244/2 |
| 2016/0159471 A1* | 6/2016 | Chan | B64C 39/024 244/39 |
| 2017/0144757 A1* | 5/2017 | Hall | H04W 4/80 |
| 2017/0190422 A1* | 7/2017 | Beaman | B64D 1/00 |

FOREIGN PATENT DOCUMENTS

WO    2008085536 A2    7/2008

* cited by examiner

*Primary Examiner* — Calvin Cheung
(74) *Attorney, Agent, or Firm* — Griffiths & Seaton PLLC

(57) ABSTRACT

Embodiments for managing drones by a processor are described. A plurality of drones are detachably coupled to each other at a first location. While the plurality of drones are detachably coupled to each other, the plurality of drones travel from the first location to a second location. At least one of the plurality of drones detaches from the others of the plurality of drones at the second location. The at least one detached drone travels from the second location to a third location.

22 Claims, 8 Drawing Sheets

METHODS AND SYSTEMS FOR MULTIPLE DRONE DELIVERY SYSTEM

BACKGROUND OF THE INVENTION

Field of the Invention

The present invention relates in general to computing systems, and more particularly, to various embodiments for managing multiple drones, such as for the delivering of products to customers.

Description of the Related Art

One of the problems expected with the practical implementation of drone (e.g., unmanned aerial vehicle (UAV)) based delivery systems is that the current state of the art drones have limited carrying (or payload) capacity. These drones also have relatively limited ranges.

Generally speaking, if a particular number of orders (or products) are to be delivered at around the same time, the same number of drones will be needed (i.e., each order will be delivered by an individual drone), and in most instances, most, if not all, of the drones used will have the same carrying capacity and range (e.g., all of the drones may be identical). However, because the delivered products will vary in size and weight, some of the drones may essentially be underutilized and/or the overall power use (or consumption) of the system will not be optimized.

SUMMARY OF THE INVENTION

Various embodiments for managing drones by a processor are described. In one embodiment, by way of example only, a method for managing drones, again by a processor, is provided. A plurality of drones are detachably coupled to each other at a first location. While the plurality of drones are detachably coupled to each other, the plurality of drones travel from the first location to a second location. At least one of the plurality of drones detaches from the others of the plurality of drones at the second location. The at least one detached drone travels from the second location to a third location.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
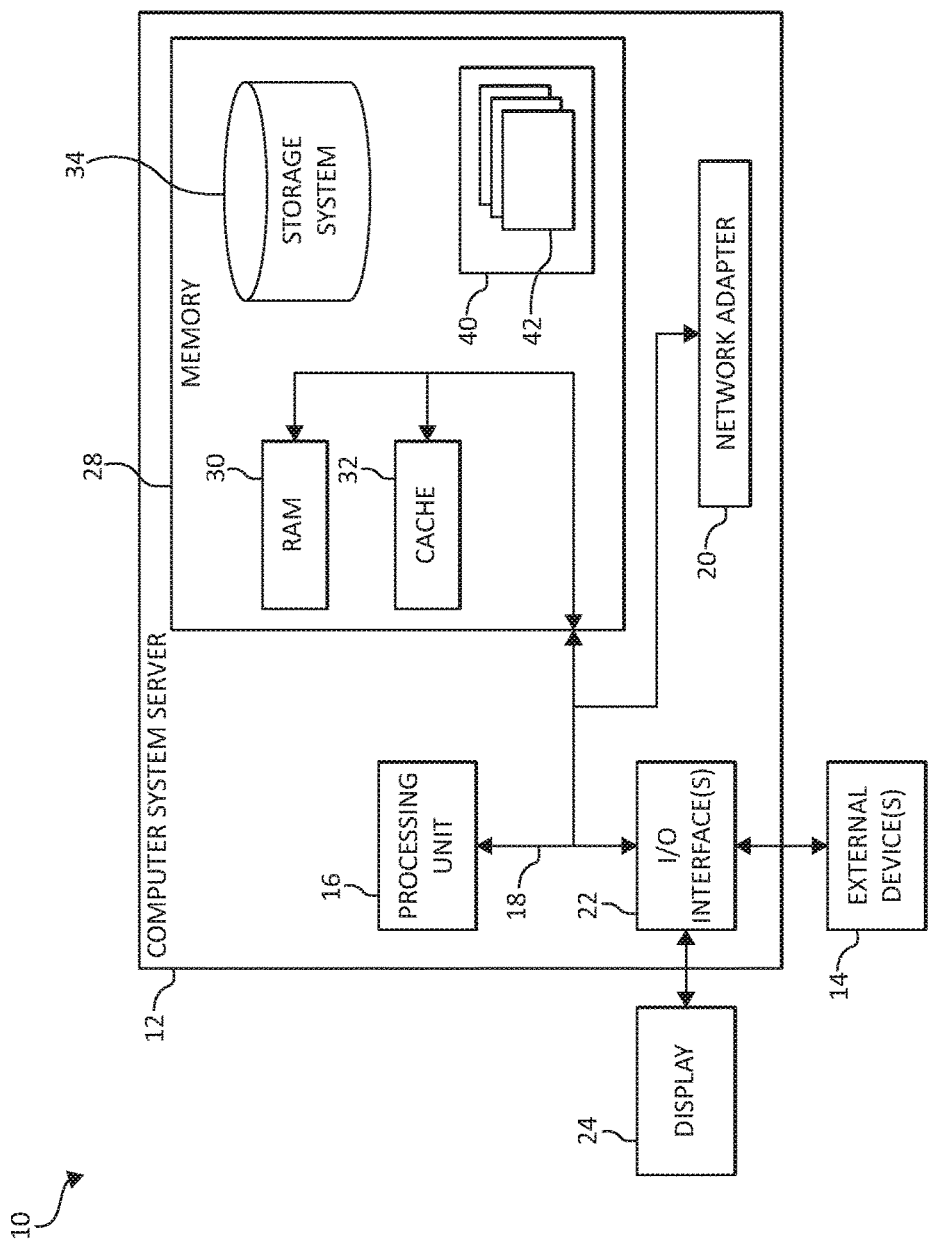
FIG. 1 is a block diagram depicting an exemplary computing node according to an embodiment of the present invention.

As previously indicated, the use of drone based delivery systems is likely to result in undesirable inefficiencies, such as underutilization of some drones and/or a lack of optimization with respect to overall power use (or consumption). This will most likely be a particular problem when the system is attempting to deliver multiple orders (or products) at around the same time because of, for example, varying sizes and weights of the products that are to be delivered to dispersed delivery points (e.g., customer addresses).

Consider an example in which two customers place orders around the same time, with one of the orders being for a very small and light product (e.g., a pen), while the other order is for a larger, heavier product (e.g., a hardback book). If identical, or even similar, drones are used to make both deliveries, some of the power used by the drone delivering the smaller, lighter product will, at least arguably, be wasted and/or underutilized, as the drone is capable of carrying a significantly larger, heavier product (or multiple products). At the same time, the power of the drone delivering the larger, heavier product may be nearly depleted, or may not even be sufficient to make the delivery or return to the warehouse from which it originated.

In view of the foregoing, a need exists for drone based delivery systems in which overall efficiency, such as that related to power consumption, is optimized, thereby reducing potential delivery delays, extending the possible range of deliveries, and maximizing the possible size and/or weight of the products delivered.

To address these needs, the methods and systems of the present invention use, for example, multiple individual drones (e.g., unmanned aerial vehicles (UAVs)), at least some of which are loaded with (i.e., are carrying) products associated with customer orders (or other items), which are coupled (or linked or connected or attached) together to form a "composite" drone. The composite drone transports the products stored on the individual drones from the origination point, or a first location (e.g., a warehouse), to a second location, along a main delivery route. At the second location, at least one of the individual drones detaches from the composite drone (i.e., the other individual drones that remain attached to each other) and transport the product(s) stored thereon to a third location (e.g., the appropriate delivery point). While the detached drone(s) is delivering its product, the composite drone may continue along the main delivery route. Along the way, other individual drones may detach from the composite drone, such as at subsequent locations along the main delivery route (e.g., a fourth location, etc.), and similarly transport the product(s) stored thereon to the appropriate locations (e.g., delivery points).

In some embodiments, after the individual drones have made their delivery, they return to a location along the main delivery route and are again attached to the other drones (i.e., they again become part of the composite drone). In some examples, when the drones are attached to each other, electrical power (and/or propulsion power) may be transferred between drones (e.g., in order to facilitate control and/or optimize range of the composite drone and/or the individual drones).

However, in some embodiments, the overall efficiency, such as with respect to power consumption and/or time, may be monitored. In the event that the system determines that it would be more efficient for the drones to simply return to the origination point by themselves, the system may control the drones to do so.

For example, if a drone would have to wait a predetermined amount of time (e.g., 30 minutes) for the composite drone to return to the location where the drone detached, or any other suitable location, in order to be reattached to the composite drone, the drone may simply return to the origination point without being reattached to any other drones. The system may monitor the location, wait times, etc. of each of the drones, both individual and composite, and manage their behavior in such a way to optimize all around efficiency.

In some embodiments, each of the (individual) drones is equipped with at least one mechanism (e.g., a coupling mechanism) that is configured to attach (or detachably couple) the drone to other drones. The coupling mechanisms may be, for example, mechanical and/or magnetic (e.g., the coupling mechanisms may attach the drones to each other using mechanical and/or magnetic forces). In some examples, at least some, if not all, of the individual drones are identical, or at least substantially identical.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in a warehouse or a drone (e.g., UAV). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
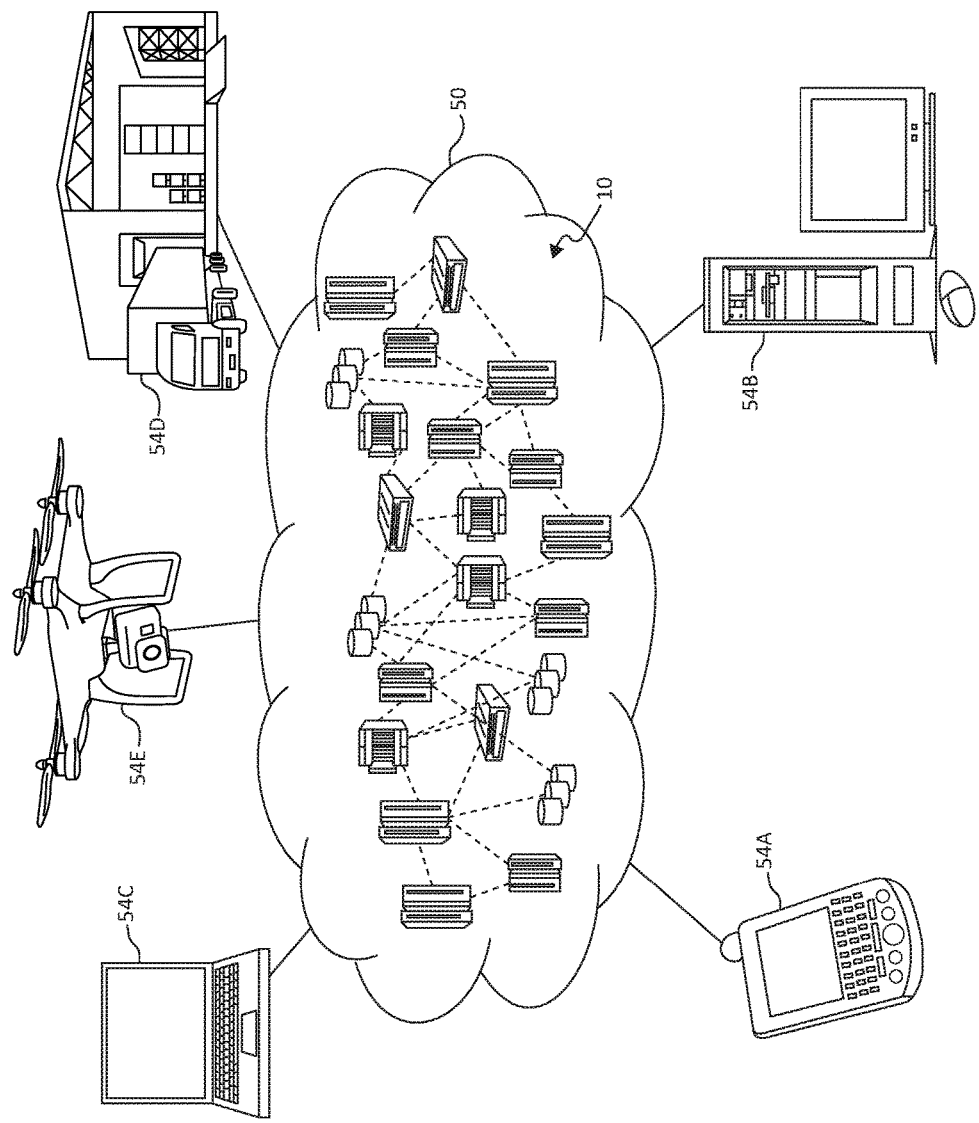
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and delivery computer systems, such as, for example, those in warehouse(s) (or origination points for deliveries) 54D and/or drone(s) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
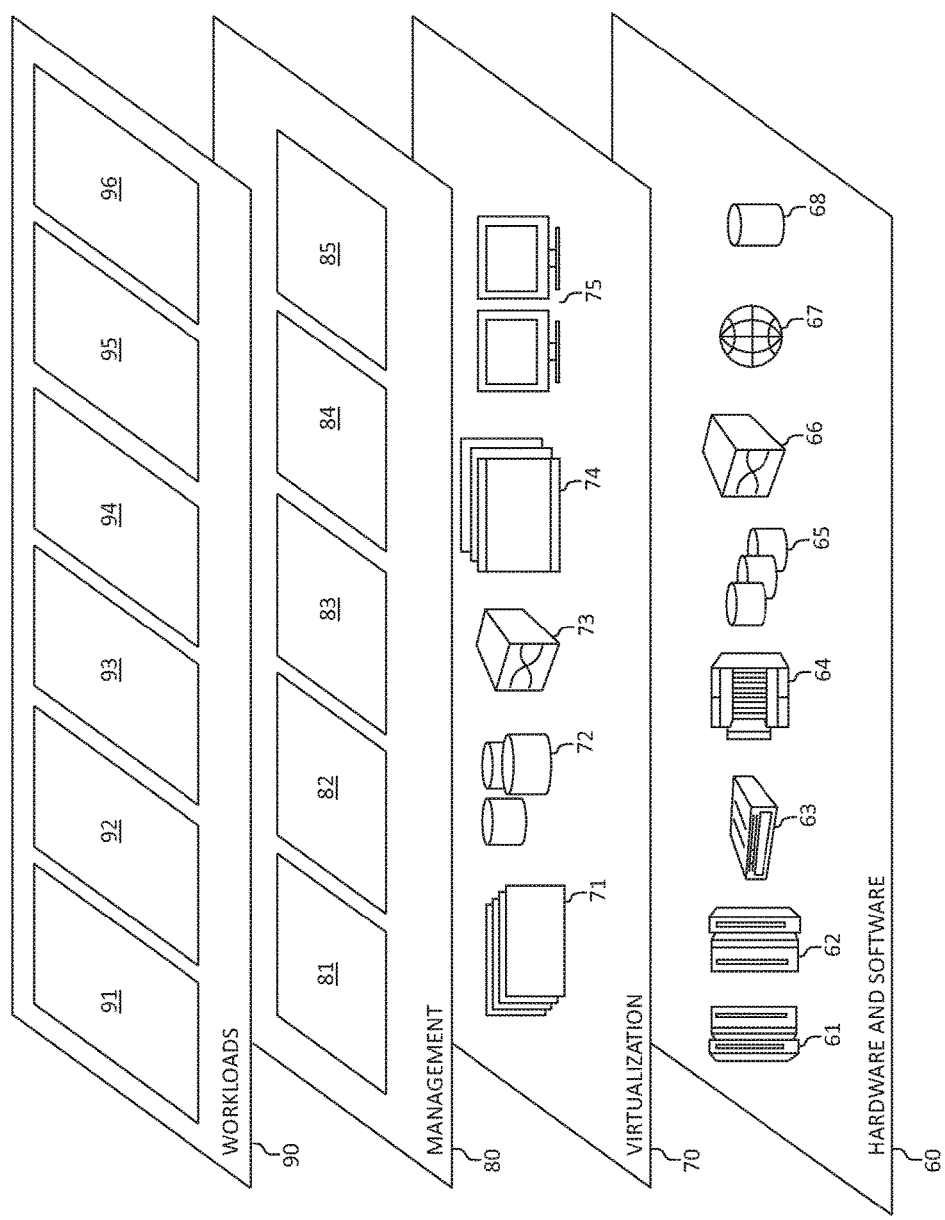
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones while making deliveries. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, such as during the delivering of products to customers. The methods and systems include a data collection aspect, where a variety of information (i.e., customer-associated information) may be collected about customers (and/or potential customers) in, for example, a particular geographic region after orders for products have been received. The information may include a delivery point (e.g., a delivery address) for each customer who has placed an order for a product that is to be delivered using the methods and systems described herein. However, it should be noted that in some embodiments, the various delivery points are not associated with customer orders per se. Rather, the delivery points may simply indicate the locations to which various products (or items) are to be delivered, regardless of any business transaction taking place (e.g., the mailing/shipping of an item, such as a gift, from one person to another). Additionally, the information may include, for example, the current date/season and weather data (e.g., temperature, chance of participation, etc.) associated with the region(s) in which the deliveries are to take place.

After one or more customer order is received (e.g., by the customer placing the order via the internet on a PDA, cellular telephone, desktop computer, etc.), the products (or goods) are loaded onto drones. In some embodiments, each product is loaded onto a respective drone. However, it should be understood that, depending on the size and weight of the products, multiple products may be loaded onto a single drone when suitable (e.g., a single customer has placed an order for multiple relatively small, light products). The products may be loaded onto the drones at a first location, such as a warehouse where the products are stored.

Figure 4:
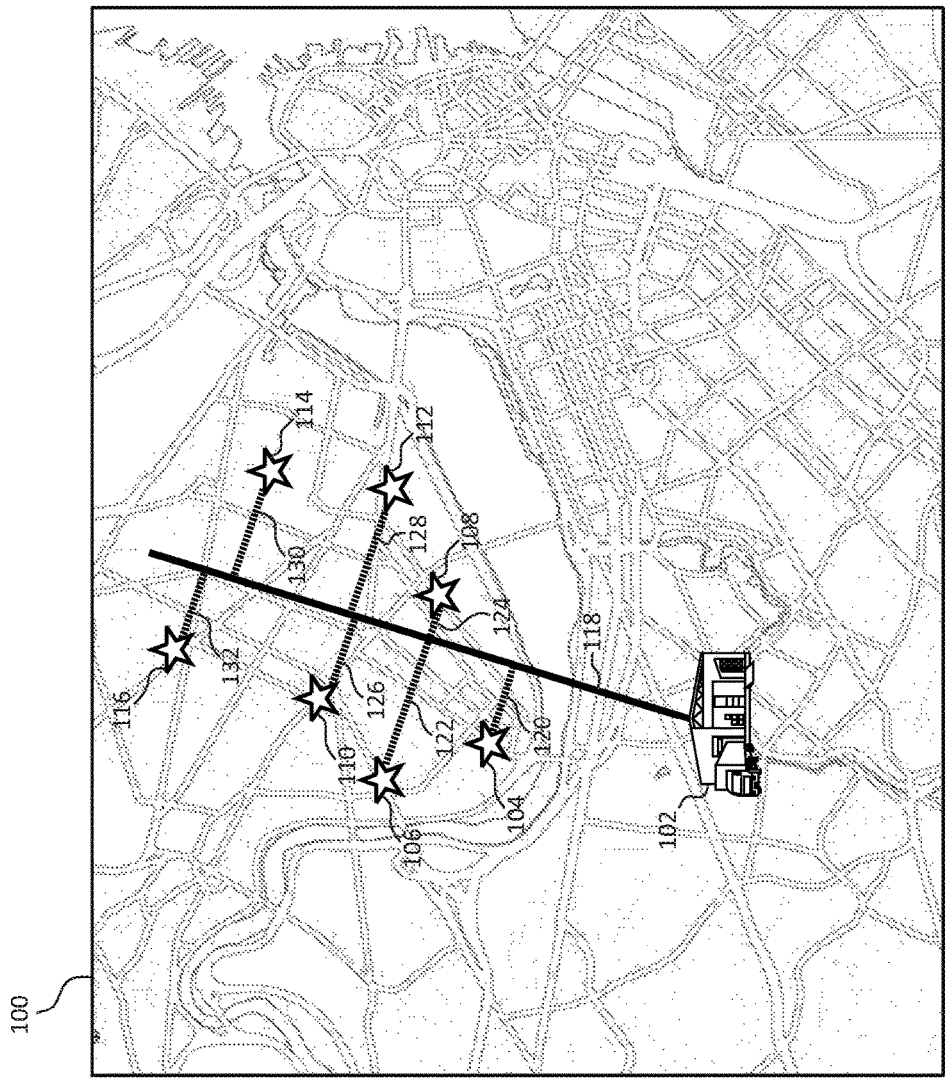
FIG. 4 is a plan view of a map having drone delivery routes indicated thereon in accordance with aspects of the present invention.

Referring to FIG. 4, a map 100 of a particular geographic region is shown. On the map 100, the location of a warehouse (or first location) 102 and the locations of multiple delivery points (e.g., customer addresses) 104-116 associated with customer orders that have been received are shown. In some embodiments, a main delivery route 118 is determined, which will be used by the "composite" drone described in greater detail below. The main delivery route 118 may be determined in such a way that the overall efficiency (e.g., with respect to power consumption) of the delivery system is optimized. As such, it should be noted that in the example shown in FIG. 4, the main delivery route 118 is essentially in the shape of a straight line extending through the middle of the various delivery points 104-116. Also shown in FIG. 4 are various secondary (or auxiliary) delivery routes 120-132, which are be used by the individual drones to deliver products to delivery points 104-116 in the manner described below. In some embodiments, the system(s) described herein control the drones in the manner(s) described below and/or otherwise enable or cause the various functionalities described to be performed.

In some embodiments, at the warehouse 102 (i.e., the first location), the products are loaded onto the respective individual drones, and the drones are attached (or coupled) to each other (as described in greater detail below). Drones attached to each other in this manner may be referred to as a "composite" drone. When all of the drones that are to be used to make deliveries to delivery points 104-116 are coupled together, the composite drone leaves the warehouse 102 and travels along the main delivery route 118, bringing the various products stored on the individual drones therewith.

When the composite drone reaches an intersection of the main delivery route 118 with one of the secondary delivery routes 120-132, one or more of the individual drones detach (or are detached) from the composite drone (and/or the other individual drones that form the remainder of the composite drone) and travel along the respective secondary delivery route 120-132 to deliver the product(s) stored thereon to the appropriate delivery point 104-116. For example, when the composite drone reaches the intersection of the main delivery route 118 with secondary delivery route 120, one (or more) of the individual drones (i.e., a first individual drone) detaches from the composite drone and travels along secondary delivery route 120 until it reaches delivery point 104, where it delivers the product stored thereon.

In some embodiments, after (e.g., immediately after) the first individual drone detaches from the composite drone, the composite drone continues along the main delivery route 118. In the exemplary embodiment shown in Fig, 4, when the composite drone reaches the intersection of the main delivery route 118 with secondary routes 122 and 124, two more individual drones detach from the composite drone and travel along the respective secondary delivery routes 122 and 124 to deliver the products stored thereon to delivery points 106 and 108, respectively. After these two individual drones detach from the composite drone, the composite drone again continues along the main delivery route 118 towards the intersections of the main delivery route 118 with secondary routes 126, 128, 130, and 132. At each of these intersections, individual drones detach from the composite drone to make deliveries to delivery points 110, 112, 114, and 116 in the manner described above.

Thus, as the composite drone travels along the main delivery route 118, individual drones detach, and depart, from the other drones within the composite drone and travel to the respective delivery points 104-116. In some embodiments, when the individual drones are connected to (and/or form part of) the composite drone, they are able to travel (e.g., fly) in such a way that power is conserved, as is described in greater detail below. As a result, the power consumption of the individual drones (and/or the composite drone) is optimized and/or the range of the individual drones is extended (e.g., when compared to the individual drones traveling detached from the composite drone during the entire delivery process).

Still referring to FIG. 4, it should be noted that the last delivery (e.g., to delivery point 116) may be made by the only drone remaining in the composite drone. That is, in some embodiments, the number of individual drones may be the same as the total number of deliveries made by all of the drones of the composite drone (e.g., seven, as shown in FIG. 4). However, in some embodiments, the number of individual drones that form the composite drone may be greater than the total number of deliveries. In such an example, after the individual drone detaches from the composite drone to make the last delivery (e.g., to delivery point 116), there may be one or more individual drones still connected to (and/or part of) the composite drone.

After transporting the respective products to the delivery points 104-116, the individual drones may return to the main delivery route 118 or simply travel to another location. In some embodiments, after making the respective deliveries, the individual drones return to the main delivery route 118 and are reattached to the composite drone, or at least one other individual drone, before travelling to another location (e.g., the warehouse 102). However, in some examples, depending on various factors such as distance, power consumption, etc., the individual drones may travel to another location without being reattached to other drones. Whether or not a particular individual drone is reattached to another individual drone (and/or the composite drone) may be based on, for example, the distance between the respective delivery point and the warehouse (or another location where the drones are to be stored and/or retrieved).

For example, still referring to FIG. 4, the individual drone that makes the delivery to delivery point 104 may return to the warehouse 102 without being reattached to other individual drones because delivery point 104 is relatively close to the warehouse 102. However, because delivery points 114 and 116 are significantly farther away from the warehouse 102, the individual drones that make deliveries to those delivery points may be reattached to each other (and/or other individual drones or the composite drone) before returning to the warehouse 102 in order to, for example, optimize power consumption and/or extend the range of those individual drones.

Figure 5:
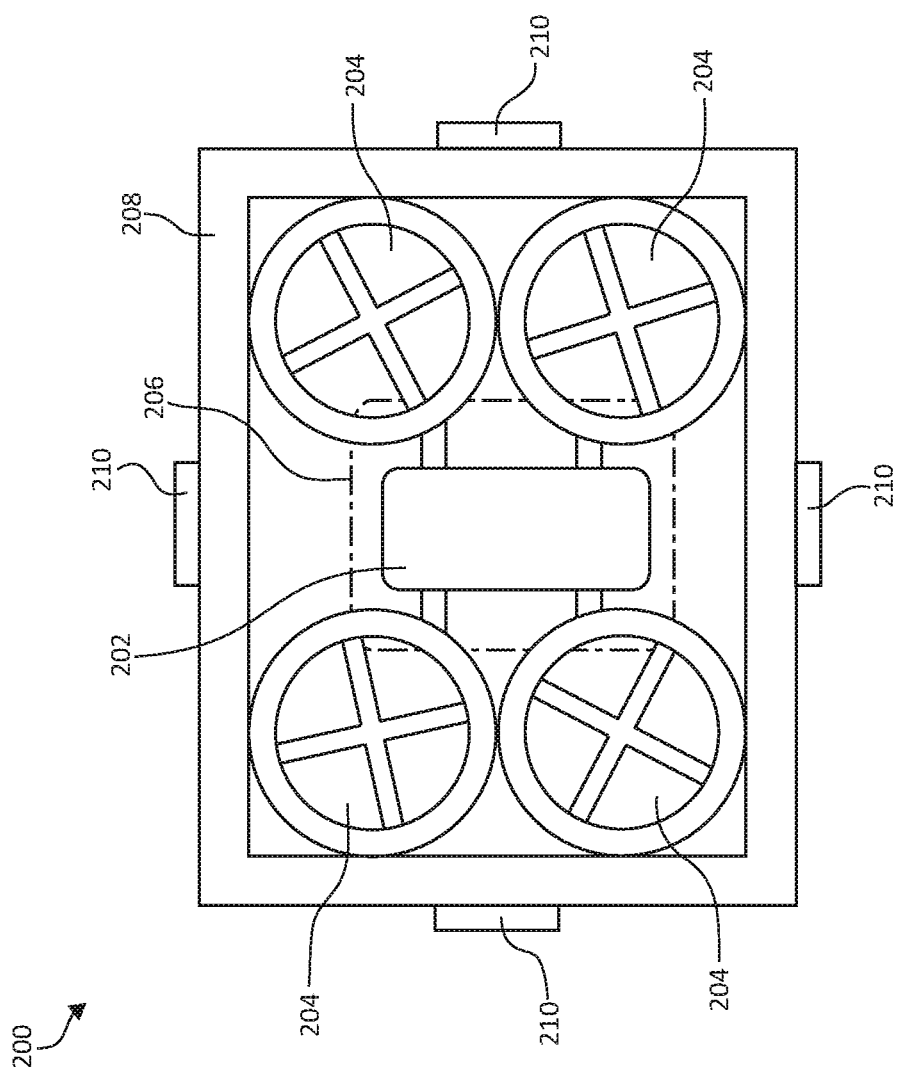
FIG. 5 is a plan view of a drone in accordance with aspects of the present invention.

FIG. 5 is a plan (or top) view of a drone (e.g., an individual drone) 200, in accordance with some embodiments described herein. In the depicted embodiment, the drone 200 is a UAV and includes a fuselage 202, rotors 204, a payload compartment 206, and a frame 208. As is shown, in the depicted embodiment, the fuselage 202 is located at a central portion of the drone 200, and although not shown in detail, may include (e.g., in an interior compartment), for example, a computing device (e.g., to control the flight of the drone, drop/release product(s), the coupling of the drone to other drones, etc.), a transceiver, and a power supply (e.g., a battery).

In the depicted embodiment, the drone 200 includes four rotors 204 (e.g., the drone 200 is a quad-copter), which are, for example, connected to the fuselage and spaced in pairs on opposing sides of the fuselage 202 in a substantially rectangular configuration. However, it should be understood that the drone 200 shown in FIG. 5 is just an example of the type and shape of drone that may be used in the systems and methods described herein. Other suitable drones may have different propulsion systems and shapes (e.g., hexagonal, circular, etc.) with coupling mechanisms (described below) spaced, for example, evenly around a periphery thereof.

Although not shown in detail, each of the rotors 204 may include a propeller and an actuator (e.g., an electric motor) configured to cause the propeller to rotate in a manner suitable to create sufficient lift to cause the drone 200 to fly. Further, in some embodiments, each of the rotors 204 may be configured to rotate or tilt about one or more axis to enhance the flight and/or flight control of the drone 200. Some of the rotors 204 may be configured such that the respective propeller is rotated in a clockwise direction (as viewed in FIG. 5), while some may be configured such that the propeller is rotated in a counterclockwise direction. Alternatively, the rotors 204 may be configured to selectively rotate the propellers in both the clockwise and counterclockwise direction.

In the depicted embodiment, the payload compartment (or payload mechanism) 206 is positioned below, and may be connected to, the fuselage 202. Although not shown in detail, the payload compartment 206 may be any container suitable for storing products during the delivery process and may include at least one actuator configured to release (or drop) the products when the drone 200 is at a delivery point. For example, the payload compartment 206 may include a door or shutter on a lower surface thereof, which when opened, causes the product(s) stored therein to drop from the payload compartment 206. Alternatively, the functionality provided by the payload compartment 206 may be performed by clamp or strap-like mechanism, which when opened, releases the product(s). Although the payload compartment 206 is shown as having a smaller overall size (at least as viewed in FIG. 5), it should be understood that in some embodiments, the payload compartment 206 may be configured to carry, or at least hold, products that have at least one dimension (e.g., a length) that is greater than the lateral width of the drone 200 (e.g., a golf club). Additionally, in some embodiments, multiple drones 200 may be attached to each other and utilize a single, shared payload compartment (e.g., for particularly large and/or heavy objects).

Still referring to FIG. 5, in the depicted embodiment, the frame 208 is substantially rectangular and extends around a periphery of, and may be connected to, the rotors 204. Of particular interest is that the frame 208 includes a coupling system that is configured to couple or attach the drone 200 to other drones in the manner(s) described above. In the depicted embodiment, the coupling system includes multiple (e.g., four) coupling mechanisms 210, each of which is positioned on a respective side of the frame 208. Although not shown in detail, each of the coupling mechanisms 210 may include one or more clamps (or other suitable mechanical devices) and/or magnets (e.g., electromagnets, permanent magnets, etc.) configured to cause the drone 200 to become coupled (or attached) to other drones. The coupling mechanisms 210 may be shaped in such a way as to minimize wind resistance (or drag). Additionally, although not shown in detail, the drone 200 may include (e.g., within the coupling mechanisms) one or more sensors, such as a camera, that may be used to properly align the drone 200 with other drones such that the drone 200 can be attached to other drones during flight.

Figure 6:
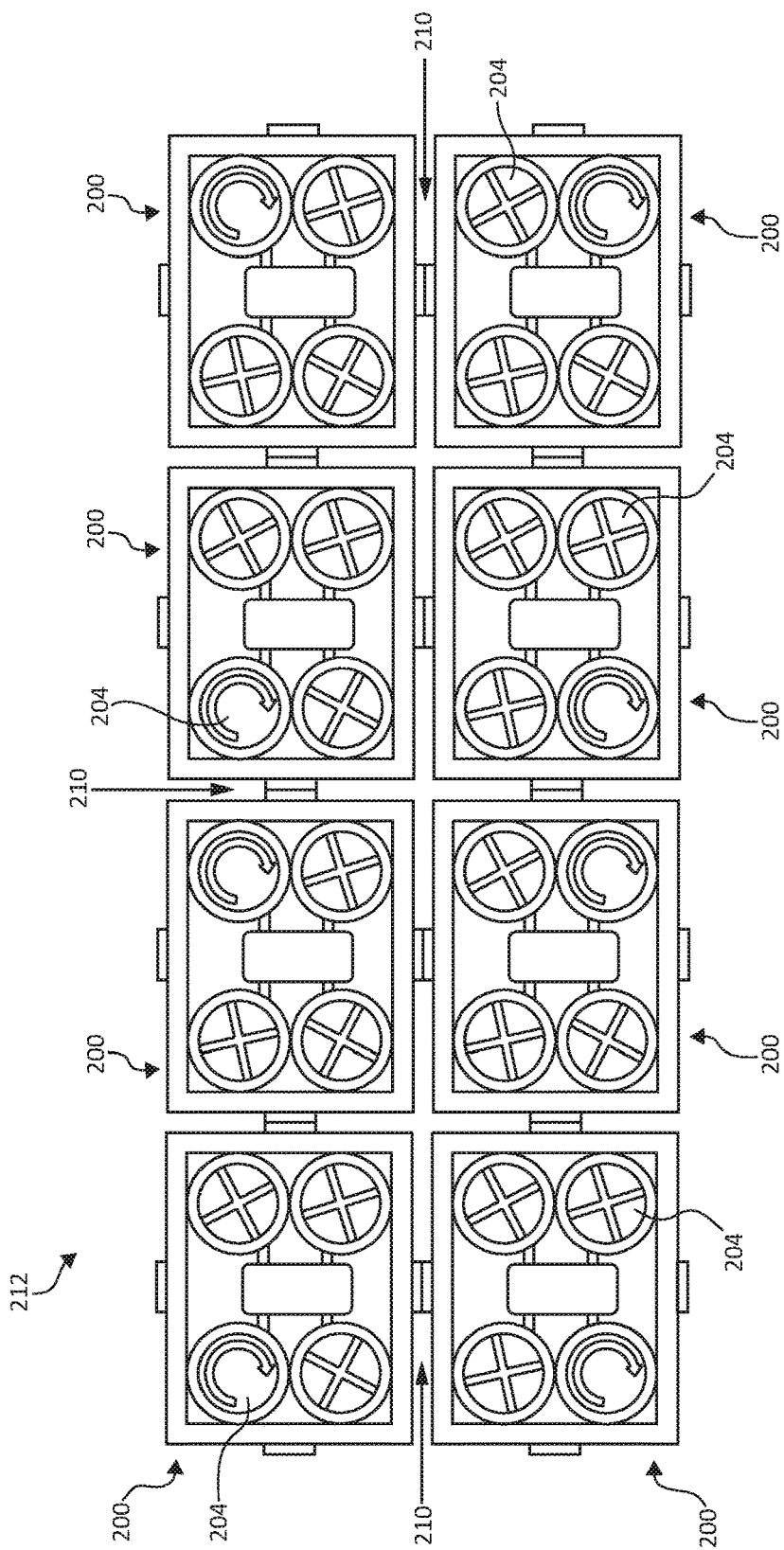
FIG. 6 is a plan view of multiple drones coupled to each other in accordance with aspects of the present invention.

As described above, in at least some embodiments described herein, the drone (or individual drones) 200 are capable of being attached to each other to form, for example, a composite drone. FIG. 6 is a plan view of an example of such a composite drone (or multiple drone delivery system) 212 that may be formed by individual drones 200 (e.g., drone 200 in FIG. 5). In the example shown in FIG. 6, the composite drone 212 includes (and/or is made of) eight individual drones 200, arranged (or coupled) in a "2×4" configuration (i.e., two rows of four drones). However, it should be understood that different numbers of individual drones 200, in different arrangement, may be used in other embodiments.

The individual drones 200 are coupled (or attached) to each other using the coupling mechanisms 210 included on each drone 200. In particular, in the example shown in FIG. 6, each drone 200 is coupled to the adjacent drone(s) 200 by the coupling mechanisms 210 of the drones 200. More specifically, the coupling mechanisms 210 of each drone 200 mate with and/or are aligned with the coupling mechanisms 210 of the adjacent drone(s) 200. In some embodiments, the coupling mechanisms 210 generate a force (e.g., mechanical and/or magnetic) suitable to hold the individual drones 200 relative to each other in a fixed and relatively rigid manner. For example, in some embodiments, while the composite drone 212 is in flight, the coupling mechanisms 210 may hold the individual drones 200 together with a force sufficient to keep all of the drones 200 coupled to each other even if none of the rotors 204 on some of the drones 200 are in use. As described above with respect to FIG. 4, in some embodiments, the individual drones 200 are coupled to each other to form the composite drone 212 at the warehouse 102. In some embodiments, the composite drone 212 is formed in flight (e.g., after the individual drones 200 have lifted off).

In some embodiments, the arrangement of the individual drones 200 in the composite drone 212 is based on the delivery point (i.e., the location thereof) for the product(s) (or order) associated with each drone 200. For example, referring to FIG. 4 in combination with FIG. 6, the drone 200 that is assigned to make a delivery to delivery point 104 may be positioned at an outer portion (e.g., an end) of the composite drone 212 because that drone is scheduled to be detached from the composite drone 212 first. In contrast, the drones 200 that are assigned to make deliveries to delivery points 114 and 116 may be positioned at an inner portion of the composite drone 212 because those drones are scheduled to be detached last.

It should be noted that the composite drone 200 is shown in FIG. 6 as it may appear in flight. In particular, the operational state of the rotors 204 of the individual drones 200 should be noted, as some of the rotors 204 are shown as being in operation, as indicated by the depicted rotational arrows, and the rest of the rotors 204 are shown as not being operated (i.e., not in use), as indicated by the stationary appearance of the propellers of those rotors 204. Although all of the operational rotors 204 are shown as rotating the respective propellers in the same direction (e.g., clockwise), it should be understood that in some embodiments, at least some of the propellers may be rotated in the opposite direction (e.g., counterclockwise) in order to, for example, maintain an appropriate amount of control of the flight of the composite drone 212.

As depicted in the example shown in FIG. 6, eight of the thirty-two rotors 204 in the composite drone 212 (or one rotor 204 on each of the individual drones 200) are being operated. As such, in the depicted embodiment, each of the individual drones 200 in the composite drone 212 may be able to obtain flight using, for example, 25% of its maximum power output (or consumption) when utilized in the composite drone configuration shown. However, if the system determines that additional lift is needed, additional rotors 204 may be selectively utilized. Thus, in some embodiments, the composite drones may have a range that is greater than that of the individual drones used to form the composite drone. In some embodiments, the drones 200 are configured to share and/or transfer battery power (and/or propulsion power), such as through the coupling mechanisms.

Figure 7:
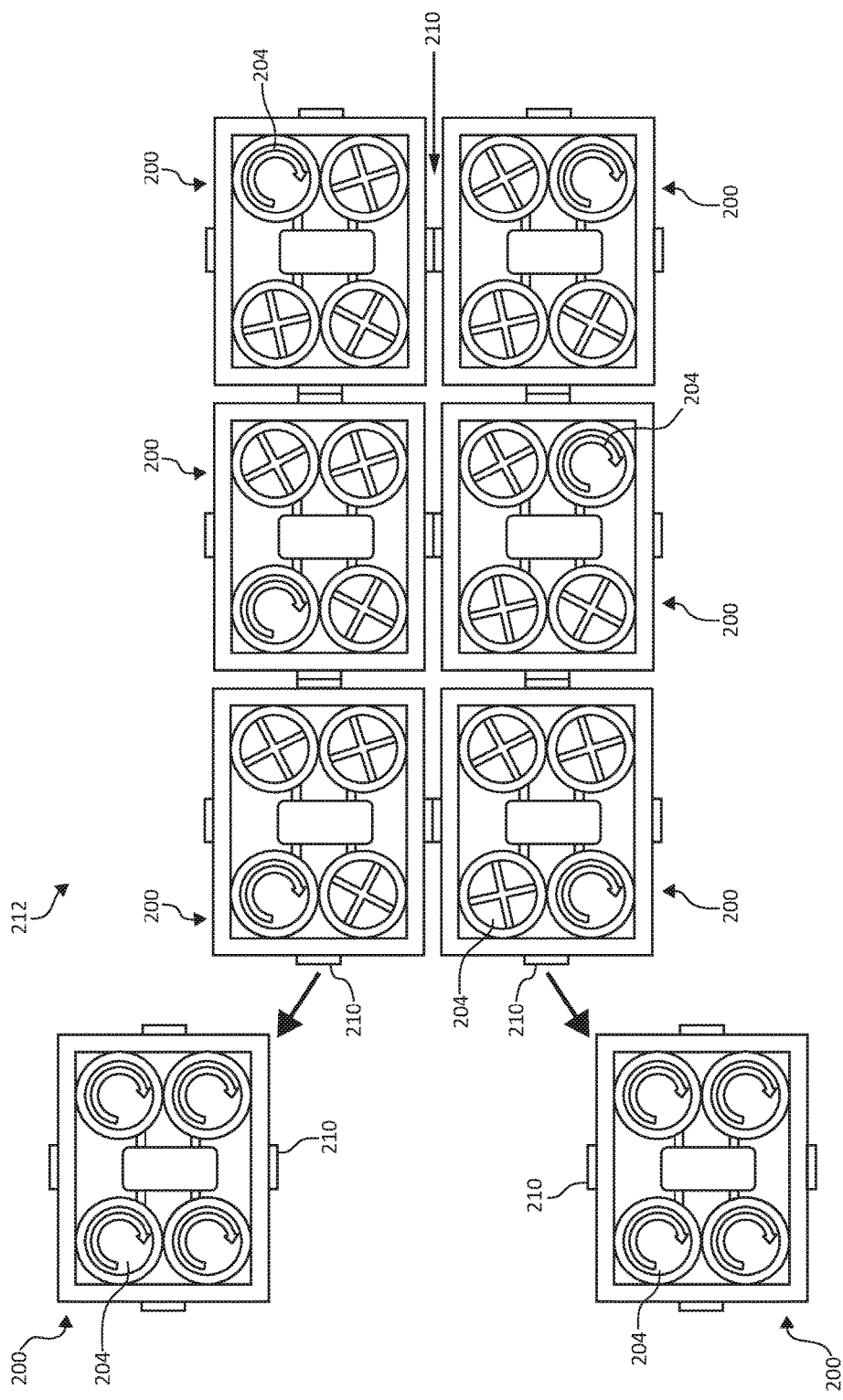
FIG. 7 is a plan view of the drones of FIG. 6 after some of the drones have detached from the other drones.

As described above, such as with respect to FIG. 4, in some embodiments, at various points along the main delivery route 118, individual drones 200 may detach from the composite drone 212 to deliver the product(s) stored thereon to the delivery points 104-116. FIG. 7 illustrates the composite drone 212 after two of the individual drones 200 have detached from the composite drone 212 (and/or the individual drones 200 that remain connected to/part of the composite drone 212). The detaching of the individual drones 200 may simply be caused by disengaging the appropriate coupling mechanisms 210 and causing the selected drones 200 to fly away from the composite drone 212 (and/or the individual drones 200 that remain connected to/part of the composite drone 212). Thus, it should be understood that in at least some embodiments, the individual drones 200 are capable of detaching from the composite drone 212 while the composite drone 212 is in flight.

As is shown in FIG. 7, after the two individual drones 200 have detached, the composite drone 212 may be considered to be formed by the six remaining individual drones 200. It should be noted that in at least some embodiments, after the individual drones 200 have detached, the operation of the rotors 204 thereon may change. For example, as shown in FIG. 7, all four rotors 204 on each of the detached individual drones 200 are now in use. It should also be noted that the operational state of at least some of the rotors 204 of the individual drones 200 still connected to the composite drone 212 has changed (when compared to FIG. 6). As will be appreciated by one skilled in the art, the operational state of some of the rotors 204 may be changed in order to, for example, to ensure the composite drone 212 maintains a suitable amount of lift and/or maintain appropriate control of its flight.

Although the two detached drones 200 are shown in FIG. 7 as being individually in flight, in some embodiments, some of the drones 200 may detach from the composite drone while still attached to each other. In other words, the detached drones 200 may be considered to form a second composite drone (i.e., the large composite drone 212 may split into two or more smaller composite drones). Such functionality may be useful when one of the individual drones 200 is carrying a particularly heavy product, as remaining attached to at least one other individual drone 200 (i.e., "helper" drones) may allow the drone 200 carrying the heavy product to share power (e.g., battery power and/or lift generated by rotors). In such an embodiment, after the delivery of the heavy product is made, that particular drone (i.e., the one that was carrying the heavy product) may return to the warehouse (or proceed to some other location), and the "helper" drone(s) may then continue to make their own scheduled deliveries. However, it should be understood, that the "helper" drones may simply be used to assist other drones with making deliveries and not carry any products themselves.

Although not specifically shown, it should be understood that the process depicted in FIGS. 6 and 7 (i.e., individual drones 200 detaching from the composite drone 212) may be performed in the reverse order, also while the composite drone 212 and the individual drone(s) 200 are in flight. More specifically, the individual drones 200 that detached from the composite drone 212 in FIG. 7 may be reattached to the composite drone by, for example, returning to their respective locations shown in FIG. 6 and reengaging the appropriate coupling mechanisms 210. However, in some embodiments, the individual drones 200 may be reattached in a configuration and/or an order that is different than that of the original composite drone 212. This may be possible because in at least some embodiments, all of the individual drones are identical, or at least substantially identical, and/or have coupling mechanisms 210 on all sides thereof. That is, a particular individual drone 200 may be able to be positioned, for example, within either an interior portion of the composite drone 212 or on one of the ends of the composite drone 212.

Figure 8:
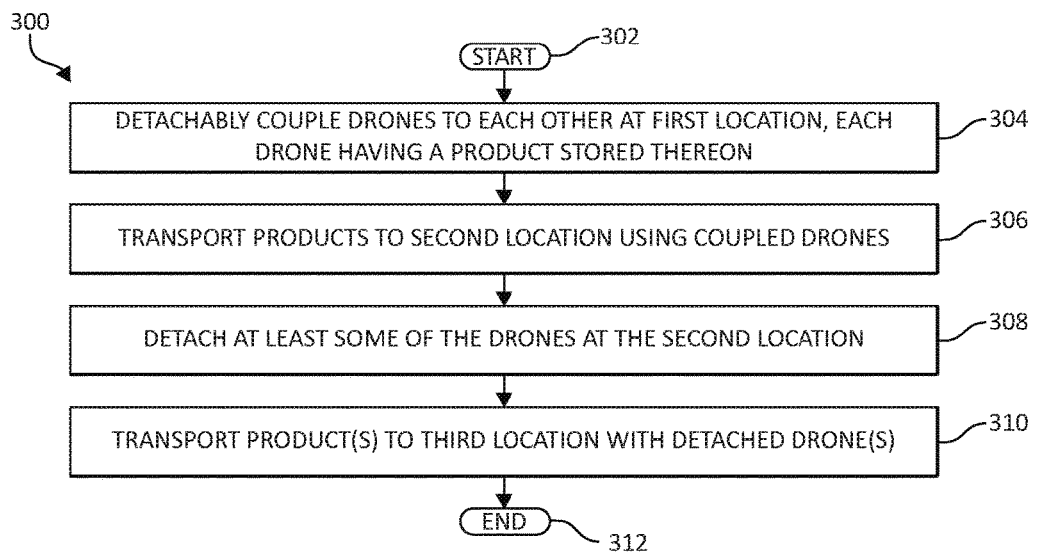
FIG. 8 is a flowchart diagram depicting an exemplary method for delivering goods to customers in which various aspects of the present invention may be implemented.

Turning to FIG. 8, a flowchart diagram of an exemplary method 300 for managing drones (e.g., to deliver products to customers), in accordance with various aspects of the present invention, is illustrated. Method 300 begins (step 302) with, for example, a plurality of customer orders for products being received and/or processed, or simply a plurality of products (or items) to be delivered to customers being selected. As described above, the products may then be loaded onto the individual drones (e.g., each product may be loaded onto a respective one of the individual drones) at, for example, a first location (e.g., a warehouse).

The drones (e.g., the individual drones), having the products stored thereon, are then detachably coupled to each other in the manner(s) described above at the first location (step 304) to, for example, form a composite drone. Alternatively, the products, or at least some of the products, may be loaded onto the respective individual drones after the drones are attached to each other. As described above, the drones may be attached (or coupled) to each other using, for example, mechanical and/or magnetic forces generated by coupling mechanisms on each of the individual drones.

The products are then transported from the first location to a second location by the drones while the drones are attached to each other (e.g., the products are transported to the second location by the composite drone) (step 306). At the second location, at least some of the individual drones detach from the composite drone (or the other individual drones that are still attached to each other) (step 308).

The detached drone(s) then transports the product(s) stored thereon from the second location to a third location (e.g., a delivery point associated with respective customer order) to, for example, deliver the product (step 310). In some examples, the products associated with each order are delivered by a single individual drone. However, it should be understood that for orders for multiple products and/or relatively large, heavy products, multiple individual drones may be used to make a single delivery.

Method 300 ends (step 312) with, for example, the individual drone(s) returning to the first location (or traveling to a different location to be stored and/or retrieved) after delivering the product(s) previously stored thereon. In some embodiments, the individual drones return to the first location without reattaching to other individual drones. However, in some examples, the individual drones reattach themselves to other individual drones (and/or the composite drone) before returning to the first location.

It should be understood that method 300 may be a simplified embodiment of the methods described herein, as method 300 only includes one occurrence of at least some of the drones detaching (step 308) and transporting the products stored thereon to the third location (step 310). In other embodiments, these steps may be repeated as, for example, the composite drone continues along its main delivery path and additional individual drones detach to make other deliveries, as described above with reference to FIG. 4. Alternatively, the embodiments described herein may include more simplified methods with fewer and/or different steps. For example, in some embodiments, the method(s) simply provide a manner in which to manage or control drones and/or deliver items that are not associated with business transactions (e.g., the shipping of an item from one party to another).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for managing drones, comprising:
    enabling a plurality of drones to couple to each other at a first location;
    while the plurality of drones are coupled to each other, controlling the plurality of drones such that the plurality of drones travel from the first location to a second location;
    enabling at least one of the plurality of drones to detach from the others of the plurality of drones at the second location;
    controlling the at least one detached drone such that the at least one detached drone travels from the second location to a third location;
    before the plurality of drones travel from the first location to the second location, enabling a respective product of a plurality of products to be loaded onto each of the plurality of drones; and
    after the at least one detached drone travels from the second location to the third location, controlling the at least one detached drone to deliver the respective product to the third location.

2. The method of claim 1, further including, after the at least one of the plurality of drones is detached from the others of the plurality of drones, controlling the others of the plurality of drones such that the others of the plurality of drones transport the respective products loaded thereon from the second location to a fourth location.

3. The method of claim 1, wherein each of the plurality of drones includes at least one coupling mechanism configured to cause the coupling of the plurality of drones to each other, and wherein said coupling is performed using at least one of a mechanical force and a magnetic force.

4. The method of claim 3, wherein each of the plurality of drones is substantially identical.

5. The method of claim 1, wherein each of the plurality of drones is an unmanned aerial vehicle (UAV).

6. The method of claim 1, wherein each of the plurality of drones are configured to transfer at least one of electrical energy or propulsion energy between the plurality of drones when the plurality of drones are coupled to each other.

7. A system for managing drones, comprising:
a processor that
enables a plurality of drones to couple to each other at a first location;
while the plurality of drones are coupled to each other, controls the plurality of drones such that the plurality of drones travel from the first location to a second location;
enables at least one of the plurality of drones to detach from the others of the plurality of drones at the second location;
controls the at least one detached drone such that the at least one detached drone travels from the second location to a third location;
before the plurality of drones travel from the first location to the second location, enables a respective product of a plurality of products to be loaded onto each of the plurality of drones; and
after the at least one detached drone travels from the second location to the third location, controls the at least one detached drone to deliver the respective product to the third location.

8. The system of claim 7, wherein the processor, after the at least one of the plurality of drones is detached from the others of the plurality of drones, controls the others of the plurality of drones such that the others of the plurality of drones transport the respective products loaded thereon from the second location to a fourth location.

9. The system of claim 7, wherein each of the plurality of drones includes at least one coupling mechanism configured to cause the coupling of each of the plurality of drones to each other, and wherein said coupling is performed using at least one of a mechanical force and a magnetic force.

10. The system of claim 9, wherein each of the plurality of drones is substantially identical.

11. The system of claim 7, wherein each of the plurality of drones is an unmanned aerial vehicle (UAV).

12. The system of claim 7, wherein each of the plurality of drones are configured to transfer at least one of electrical energy or propulsion energy between the plurality of drones when the plurality of drones are coupled to each other.

13. A computer program product for managing drones by a processor, the computer program product comprising a non-transitory computer-readable storage medium having computer-readable program code portions stored therein, the computer-readable program code portions comprising:
an executable portion that enables a plurality of drones to couple to each other at a first location, wherein each of the plurality of drones has a respective one of a plurality of products loaded thereon;
an executable portion that, while the plurality of drones are coupled to each other, controls the plurality of drones such that the plurality of drones transport the plurality of products from the first location to a second location;
an executable portion that enables at least one of the plurality of drones to detach from the others of the plurality of drones at the second location;
an executable portion that controls the at least one detached drone such that the at least one detached drone transports the respective product from the second location to a third location to deliver the product to a customer;
an executable portion that, before the plurality of drones travel from the first location to the second location, enables a respective product of a plurality of products to be loaded onto each of the plurality of drones; and
an executable portion that, after the at least one detached drone travels from the second location to the third location, controls the at least one detached drone to deliver the respective product to the third location.

14. The computer program product of claim 13, wherein the computer-readable program code portions further include an executable portion that, after the at least one of the plurality of drones is detached from the others of the plurality of drones, controls the others of the plurality of drones such that the others of the plurality of drones transport the respective products loaded thereon from the second location to a fourth location.

15. The computer program product of claim 13, wherein each of the plurality of drones includes at least one coupling mechanism configured to cause the coupling of each of the plurality of drones to each other, and wherein said coupling is performed using at least one of a mechanical force and a magnetic force.

16. The computer program product of claim 15, wherein each of the plurality of drones is substantially identical.

17. The computer program product of claim 13, wherein each of the plurality of drones is an unmanned aerial vehicle (UAV).

18. The computer program product of claim 13, wherein each of the plurality of drones are configured to transfer at least one of electrical energy or propulsion energy between the plurality of drones when the plurality of drones are coupled to each other.

19. A multiple drone delivery system, comprising:
a plurality of unmanned aerial vehicles (UAVs), wherein each of the plurality of UAVs is substantially identical to the others of the plurality of UAVs, each of the plurality of UAVs configured to load and carry a respective product of a plurality of products; and
a plurality of coupling mechanisms, each of the plurality of coupling mechanisms being connected to at least one of the plurality of UAVs and being configured to couple the at least one of the plurality of UAVs to another of the plurality of UAVs; wherein, using the plurality of coupling mechanisms, the plurality of UAVs are each configured to be coupled at a first location for travel from the first location to a second location, and wherein the at least one of the plurality of UAVs is configured to detach from the others of the plurality of UAVs at the second location and travel to a third location such that the detached one of the plurality of UAVs is configured to deliver the respective product to the third location.

20. The system of claim 19, wherein the coupling mechanisms are configured such that said coupling is performed using at least one of a mechanical force and a magnetic force.

21. The system of claim 19, wherein at least some of the plurality of UAVs include a payload mechanism configured to carry a product.

22. The system of claim 19, wherein the plurality of coupling mechanisms are configured to transfer at least one of electrical energy or propulsion energy between the plurality of UAVs when the at least one of the plurality of UAVs is coupled to the other of the plurality of UAVs.

* * * * *